United States Patent Office 2,861,114
Patented Nov. 18, 1958

2,861,114

THERMOCOUPLE AND ELEMENTS THEREOF

Hideo Nishimura, Yoshida, Sakyo-ku, Japan

Application May 22, 1956, Serial No. 586,421

Claims priority, application Japan May 23, 1955

1 Claim. (Cl. 136—5)

This invention relates to a new thermocouple element or component and particularly to a new platinum·molybdenum alloy, platinum·tungsten alloy or platinum·molybdenum·tungsten alloy which is useful as an element for thermocouple.

A platinum·rhodium alloy in which the content of rhodium is either 10% or 13% has been conventionally used as a thermocouple element for high temperatures. However, such element has defects because of the fact that its thermoelectromotive force when it is coupled with platinum is comparatively so small as, for example, about 14.582 mv. at 1300° C. and that the element is costly because the amount of production of rhodium in the world is very small.

It is the object of this invention to provide a thermocouple which is not inferior to the conventional platinum-platinum·rhodium (13%) thermocouple in its stability, homogeneity, corrosion-resistance and heat-resistance at high temperatures and which linearly shows values 1.5 to 3 times as high as those of the conventional ones in its thermoelectromotive force characteristics.

The essence of this invention is to use, as the thermocouple element, a platinum alloy containing either or both of molybdenum and tungsten in the range of 0.5 to 20%, preferably 0.5 to 11%. I have found a platinum·molybdenum alloy containing 0.5 to 6% of molybdenum, a platinum·tungsten alloy containing 0.5 to 10% of tungsten, or a platinum·molybdenum·tungsten alloy containing 0.5 to 6% of molybdenum and 0.5 to 5% of tungsten is most satisfactory for the purpose of my invention.

The manufacture of the platinum alloy is not the purpose of the present invention and therefore details thereabout are omitted. It is preferable, however, to prepare said alloy by the following method:

Finely divided platinum and finely divided molybdenum or tungsten or mixture of the latter two in a desired proportion within the range stated above are mixed thoroughly and then compressed and molded. The molded product is melted by means of electrical arc with tungsten electrode in an inert gas atmosphere such as, for example, of argon or helium. The cast block thus obtained is annealed and then forged and formed or drawn into a wire or the like. By this method, a very homogeneous product can be obtained in a good yield.

The invention will be more fully explained with reference to several examples in the following description made in connection with the accompanying drawings in which.

Hereinafter, platinum, rhodium, molybdenum and tungsten shall be abbreviated as Pt, Rh, Mo and W respectively.

Figure 1:
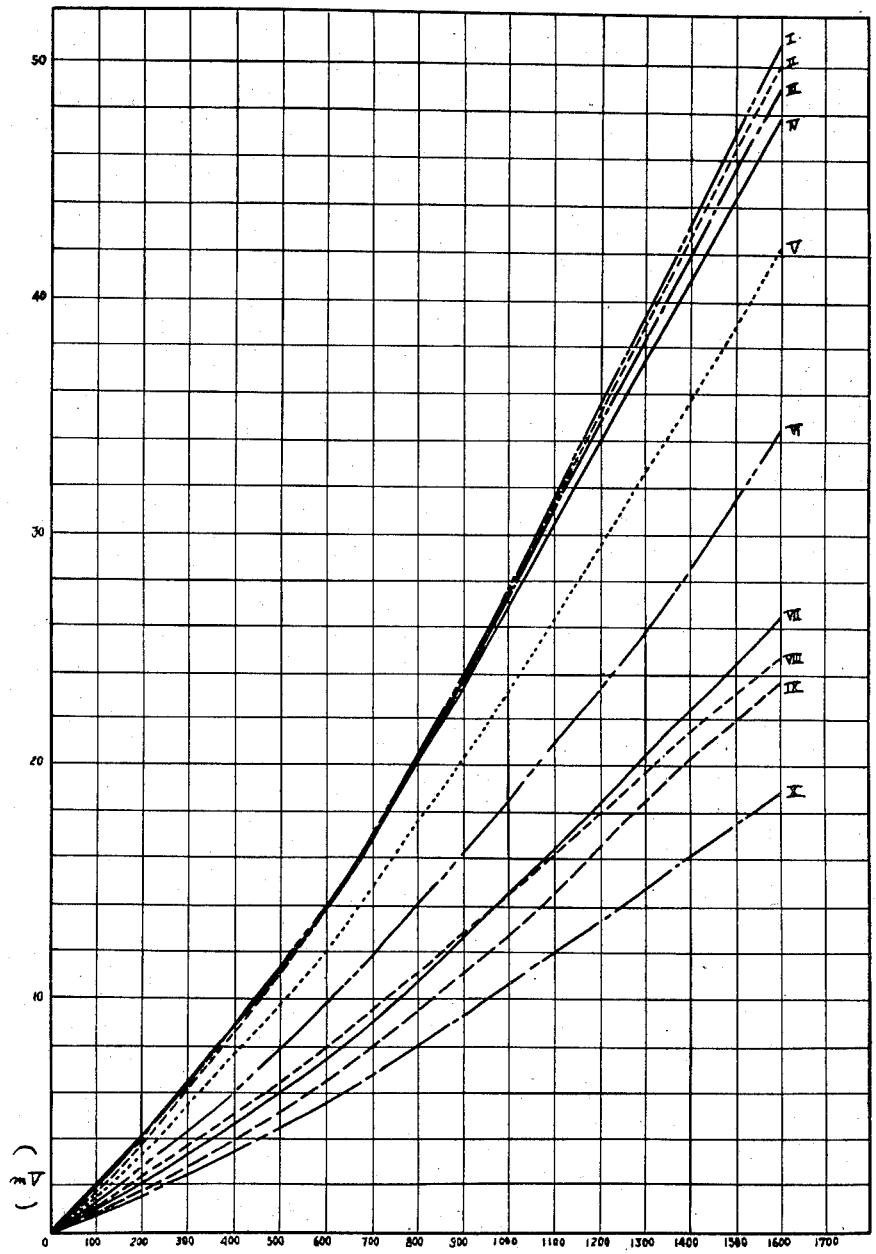
Fig. 1 is a graph showing the thermoelectromotive force characteristics of several thermocouples wherein platinum is coupled with each of element wires in accordance with my invention, except the curve X in which platinum is coupled with the conventional platinum·rhodium (13%) wire.

Fig. 1 shows the thermoelectromotive force characteristics of several thermocouples in the case that Pt is used as an element wire on one side. In the graph, the abscissa indicates temperatures (° C.) and the ordinate indicates thermoelectromotive force (mv.). The cold junction temperature is 0° C. for all cases. The curves I, II, III, IV, V, VI, VII, VIII and IX are thermoelectromotive force characteristics curves of Pt—Pt·Mo (4%), Pt—Pt·Mo (3.5%)·W (1%), Pt—Pt·Mo (3.5%), Pt—Pt·Mo (3%), Pt—Pt·Mo (5%), Pt—Pt·W (2%)·Mo (1%), Pt—Pt·W (1%)·Mo (1%), Pt—Pt·Mo (1%) and Pt—Pt·W (3%) thermocouples respectively. The curve X is thermoelectromotive force characteristics curve of the conventional Pt—Pt·Rh (13%) thermocouple which is given as a comparative example.

It will be appreciated from this graph that the thermocouples in which the element wires of the invention are used linearly show values considerably higher than the conventional thermocouple in the thermoelectromotive force characteristics. For example, the Pt—Pt·Mo (4%) thermocouple has a thermoelectromotive force of 38.9 mv. at 1300° C. (see curve I) which value is about 2.7 times higher than 14,582 mv. of the conventional Pt—Pt·Rh (13%) thermocouple (see curve X). Furthermore, it substantially shows linearity which is very important in practicality.

The great difference in the thermoelectromotive force between the use of the Pt·Mo (4%) element wire and the use of the Pt·Rh (13%) element wire means or represents the superiority of the electromotive force characteristics in the case that a thermocouple is formed by making these two element wires couple. In fact, when these two are coupled, a thermocouple having thermoelectromotive force, at 1300° C., of 24,418 mv. which corresponds to the difference mentioned above can be obtained (see curve XI in Fig. 2). In this case, the melting points of the respective alloys, namely Pt·Mo and Pt·Rh are higher than that of platinum alone, and accordingly measurement at temperatures higher than 1400° C. which is the normal limit of the available temperature of platinum and then 1600° C. which is the available limit of overheating of platinum can be practically carried out.

Figure 2:
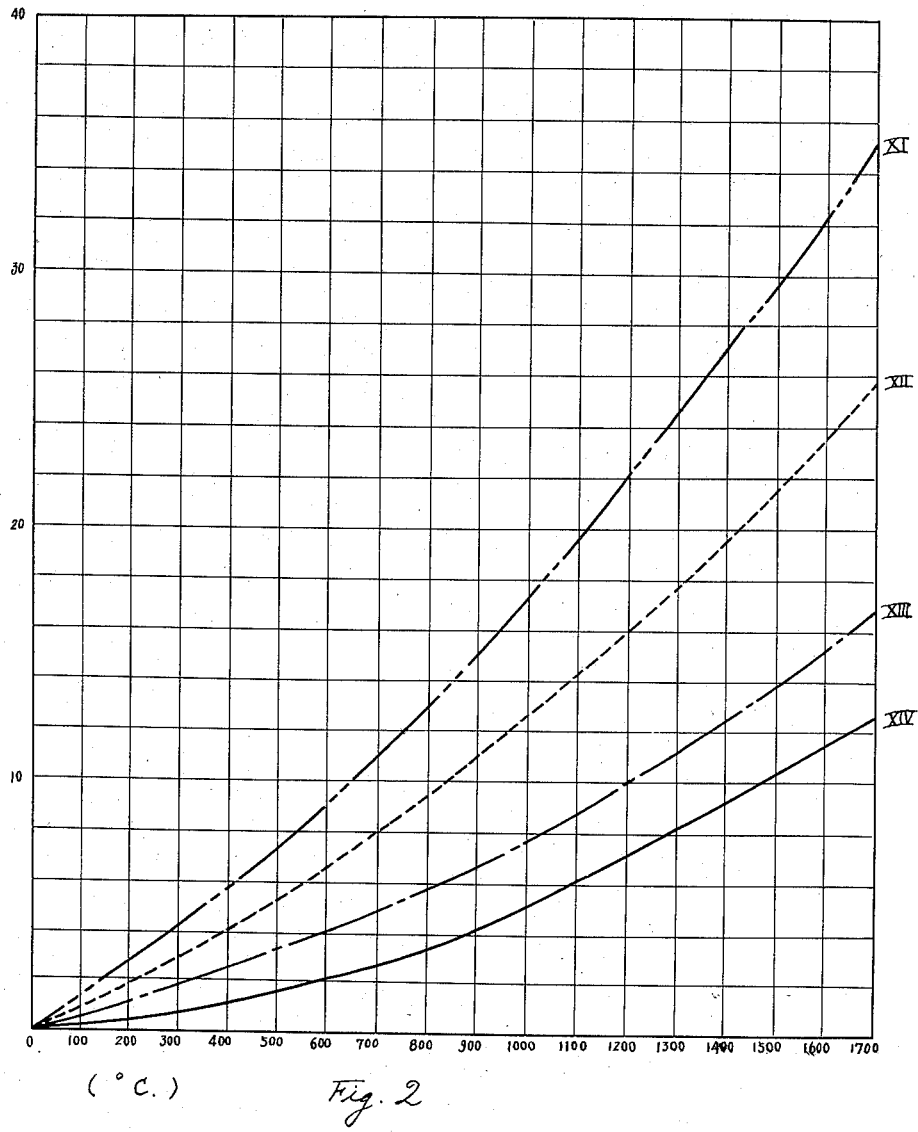
Fig. 2 is a graph showing the thermoelectromotive force characteristics of several thermocouples wherein platinum·rhodium (13%) is coupled with each of element wires in accordance with my invention, except the curve XIV in which platinum·rhodium (13%) is coupled with platinum·rhodium (18%) wire.

Fig. 2 shows the thermoelectromotive force characteristics of several thermocouples formed by coupling several element wires according to this invention with a Pt·Rh (13%) element wire respectively. The curves XI, XII and XIII are thermoelectromotive force characteristics curves of Pt·Rh (13%)—Pt·Mo (4%), Pt·Rh (13%)—Pt·Mo (5%) and Pt·Rh (13%)—Pt·W (2%)·Mo (1%) thermocouples respectively. The curve XIV shows the thermoelectromotive force characteristics of Pt·Rh (13%)—Pt·Rh (18%) thermocouple which will serve here as a comparative example.

It will be seen also from this graph that the thermocouples in which the element wires of this invention are used have high and excellent thermoelectromotive force characteristics, particularly in the high temperature range of 1400 to 1700° C., that have never seen in the conventional ones.

According to the results of my experiments, the thermocouple element wires of this invention are not inferior to the conventional ones in thermoelectromotive stability and corrosion-resistance. For example, a platinum-platinum·molybdenum (3%) thermocouple has not shown any noticeable deviation in its thermoelectromotive force characteristics in the use for three continuous months at 1300° C.

Figure 3:
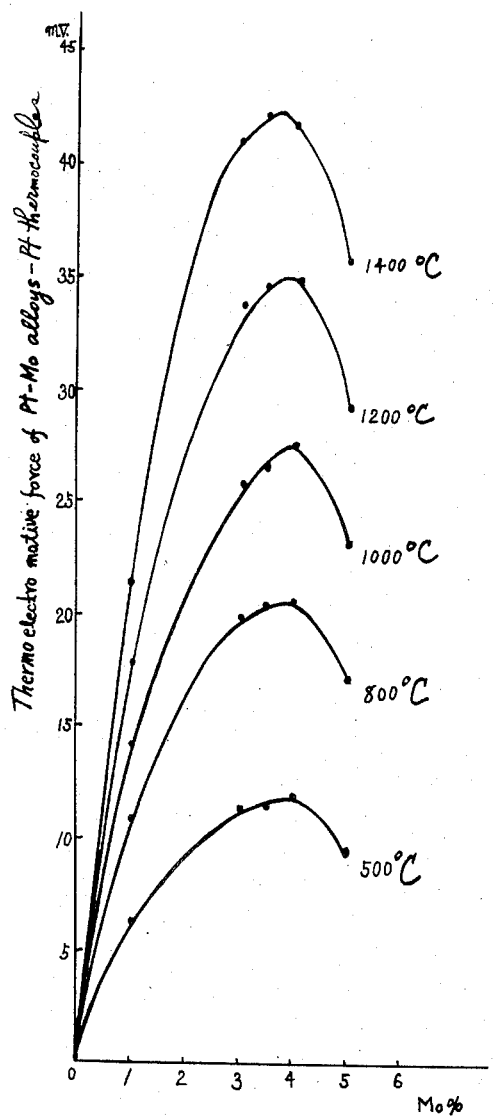
Fig. 3 is a graph interpreting the data of Fig. 1, wherein the thermoelectromotive force is shown in dependence on the molybdenum contents of the platinum-platinum·molybdenum alloy thermocouple.

Fig. 3 shows the thermoelectric force characteristics of the curves I, III, IV, V and VIII of Fig. 1, i. e., of platinum-platinum·molybdenum thermocouples in terms of the molybdenum contents of the platinum·molybdenum alloy.

It will be observed that a maximum of the thermoelectromotive force occurs at about 3.5–4% of molybdenum contents. The use of more than 4% molybdenum is unnecessary.

Figure 5:
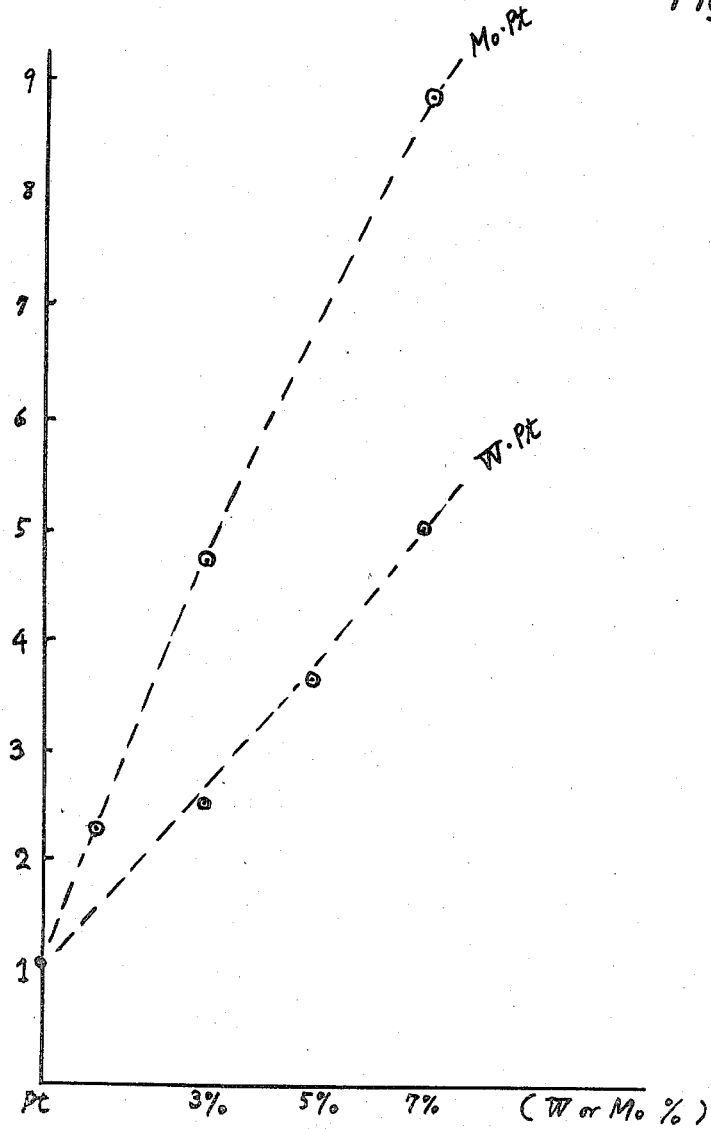
Fig. 5 is a graph showing the resistance of platinum·molybdenum and platinum·tungsten alloys in dependence on the molybdenum or tungsten contents respectively.

However, platinum·molybdenum alloys show several disadvantages in their use, among which the following are noticed: these alloys are not entirely satisfactory as to their strength; their electric resistance is undesirably high, as evident from Fig. 5; they are difficult to be drawn to wire or the like.

Figure 4:
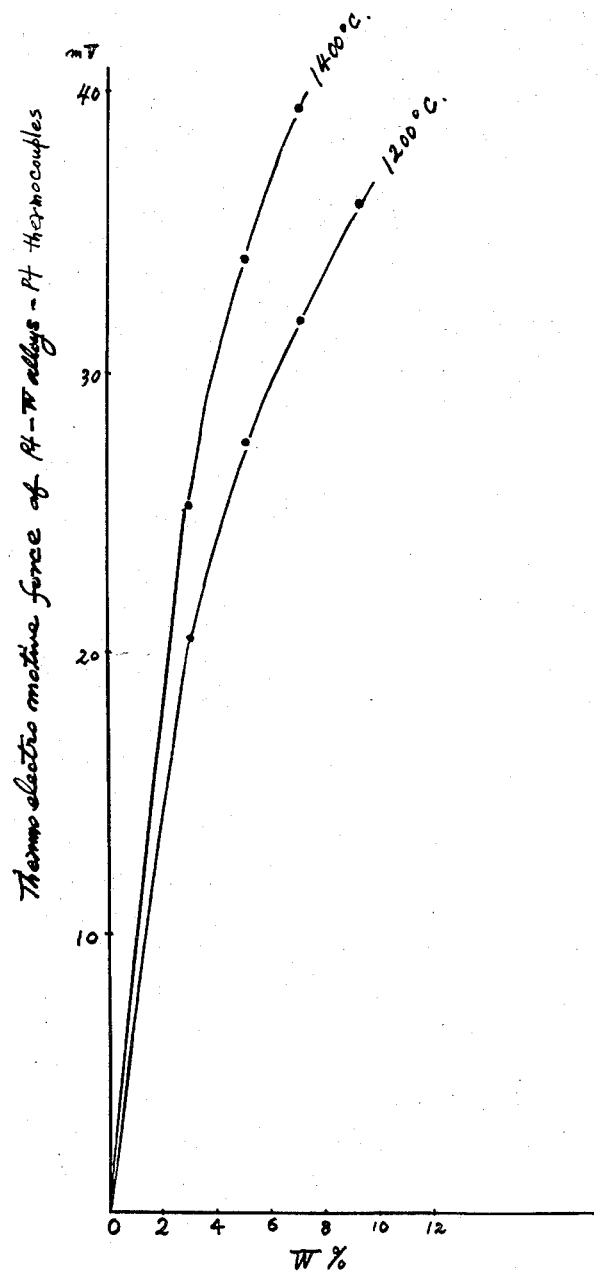
Fig. 4 is a graph showing the thermoelectromotive force shown in dependence on the tungsten contents of platinum-platinum·tungsten thermocouples.

It has been found that an addition of a certain amount of tungsten to platinum·molybdenum alloys serves to relieve the above mentioned disadvantages to a large degree. On the other hand, it was found that thermoelectromotive force curves of platinum-platinum·tungsten alloys show no maxima up to 10% tungsten contents, as evident from Fig. 4.

It has further been found that when the total contents of molybdenum and tungsten in the metal exceeds 7%, the alloy is very difficult to be drawn to wire or the like. However, good results are obtainable with alloys below 7% total contents of molybdenum and tungsten.

As described above and as seen in the drawings, the thermocouple element wire of the present invention shows a thermoelectromotive force considerably higher than that of any conventional one at the same temperature. In addition, its thermoelectromotive force characteristics curve is substantially linear and does not show any inflection point. The thermocouple element wire of this invention shows strong resistance to acids and other chemicals and, furthermore, its material cost is lower than that of the conventional platinum·rhodium element.

I claim:

A thermocouple formed by coupling platinum with a platinum-molybdenum-tungsten alloy in which the amount of molybdenum is between 0.5 and 4% while the amount of tungsten is between 3 and 6.5%, the sum of molybdenum and tungsten being less than 7%.

References Cited in the file of this patent

UNITED STATES PATENTS

| | | |
|---|---|---|
| 1,407,525 | Fry | Feb. 21, 1922 |
| 2,012,465 | Godecke | Aug. 27, 1935 |
| 2,335,707 | Steicher | Nov. 30, 1943 |
| 2,406,172 | Smithells | Aug. 20, 1946 |
| 2,537,733 | Brenner | Jan. 9, 1951 |